(12) United States Patent
Rowse

(10) Patent No.: US 7,720,438 B2
(45) Date of Patent: May 18, 2010

(54) REDUCING POWER CONSUMPTION OF A SHORT-RANGE WIRELESS COMMUNICATION READER ASSOCIATED WITH A MOBILE TERMINAL

(75) Inventor: Graham Rowse, Farnborough (GB)

(73) Assignee: Nokia Corporation, Espoo (FI)

( * ) Notice: Subject to any disclaimer, the term of this patent is extended or adjusted under 35 U.S.C. 154(b) by 535 days.

(21) Appl. No.: 11/093,585

(22) Filed: Mar. 30, 2005

(65) Prior Publication Data

US 2006/0229113 A1    Oct. 12, 2006

(51) Int. Cl.
*H04B 5/00* (2006.01)

(52) U.S. Cl. .................. 455/41.1; 455/41.2; 455/515; 455/574

(58) Field of Classification Search ............. 455/41.1, 455/41.2, 515, 574
See application file for complete search history.

(56) References Cited

U.S. PATENT DOCUMENTS

| | | | |
|---|---|---|---|
| 5,909,585 A | 6/1999 | Shinmiya | |
| 6,150,948 A * | 11/2000 | Watkins | 340/693.3 |
| 6,526,286 B2 * | 2/2003 | Wan | 455/515 |
| 6,622,567 B1 | 9/2003 | Hamel et al. | |
| 6,655,591 B1 * | 12/2003 | Feng | 235/454 |
| 7,021,535 B2 * | 4/2006 | Overhultz et al. | 235/382 |
| 7,047,051 B2 * | 5/2006 | Sackett et al. | 455/574 |
| 7,145,437 B2 * | 12/2006 | Jalkanen et al. | 340/10.3 |
| 7,145,454 B2 * | 12/2006 | Linjama et al. | 340/540 |
| 7,162,279 B2 * | 1/2007 | Gupta | 455/574 |
| 7,209,771 B2 * | 4/2007 | Twitchell, Jr. | 455/574 |
| 7,212,123 B2 * | 5/2007 | Waters et al. | 340/572.5 |
| 7,236,810 B1 * | 6/2007 | Underbrink et al. | 455/574 |
| 2004/0176032 A1 * | 9/2004 | Kotola et al. | 455/41.2 |
| 2005/0033544 A1 * | 2/2005 | Brooks et al. | 702/128 |
| 2005/0096102 A1 * | 5/2005 | Mock et al. | 455/574 |
| 2005/0164633 A1 * | 7/2005 | Linjama et al. | 455/41.2 |

FOREIGN PATENT DOCUMENTS

| | | |
|---|---|---|
| WO | WO 03/030988 | 4/2003 |
| WO | WO 03/054825 A2 | 7/2003 |
| WO | WO 03/056717 A1 | 7/2003 |
| WO | WO 03/098851 A1 | 11/2003 |

* cited by examiner

*Primary Examiner*—Yuwen Pan
*Assistant Examiner*—April G Gonzales
(74) *Attorney, Agent, or Firm*—Alston & Bird LLP

(57) ABSTRACT

Methods, mobile terminal devices and computer program products are provided that are capable of reducing power consumption by detecting error events signifying unsuccessful short-range wireless communication activation operations and adjusting the frequency of the activation of the reader based on the detection of the error events. In this regard, the invention prevents the device from powering-up the processor for the read operation when the mobile terminal is in the vicinity of a wireless communication system whose signals are being received by the mobile terminal but are not intended for the use of the mobile terminal. By limiting the powering-up of the processor, power of the mobile terminal is preserved.

24 Claims, 6 Drawing Sheets

REDUCING POWER CONSUMPTION OF A SHORT-RANGE WIRELESS COMMUNICATION READER ASSOCIATED WITH A MOBILE TERMINAL

FIELD OF THE INVENTION

This invention relates to the optimization of power consumption of battery powered devices, and more particularly, relates to the optimization of power consumption by a short-range wireless communication reader, such as a radio frequency identification (RFID) reader, associated with a multifunctional mobile terminal.

BACKGROUND OF THE INVENTION

Short-range wireless communication readers, such as Radio Frequency Identification (RFID) readers are becoming more prominent in a wide variety of mobile digital devices, such as cellular phones, personal digital assistants, pagers and other mobile terminals. The short-range communication readers provide the devices with the ability to communicate via RFID, Bluetooth®, infrared or other types of short range communication dependent upon the type of reader associated with the mobile terminal. Continuous active operation of the readers, however, consumes significant amounts of power. Therefore, in a typical mobile terminal with short-range communication capabilities the device is prone to require a larger power supply and/or more frequent charging of the power supply, as compared to the mobile terminal that is not equipped to communicate via a short-range communication medium. Both larger power supplies and more frequent power supply charging are not viable alternatives in the mobile environment. Larger power supplies lead to larger mobile terminals, which is counter-intuitive to the general mobile concept that "smaller is better" or at least more practical. In the same regard, frequent charging of the mobile terminal power supply is inconvenient for the user and reduces the lifetime expectancy of the power supply.

For example, a typical low frequency RFID reader runs on a 3 Hz scan cycle; meaning that it is activated, i.e., "wakes up", once every 330 ms to check for transponders in the general vicinity. With current technology, this type of repetitive activation can add up to upwards of 20 percent of the power consumed by the mobile terminal. However, in the vast majority of instances the wake-up period results in no transponders being available, so that the power that is consumed is unwarranted.

In other instances, the signals that are detected pertain to an unsupported format or some other false detection. These unsupported formats and false detections further exacerbate problems related to power consumption because they trigger more frequent activation of the reader and in some instances further processing of the unsupported format to determine its incompatibility. As more short-range wireless communication systems are implemented using differing field strengths and differing operating distances they will in turn prompt more frequent triggering of the of the signal detection circuits, which start the systems auto triggering functions. This is because many of systems will have field strengths that could potentially set off RF detection systems that are intended to work only for short-range proximate communications. For example, as door access systems, "I code" or "EPC global" retail checkout systems or other systems having larger field radiation (i.e., stronger signals) become more commonplace they may trigger basic short-range communication detection systems, such as RFID readers and the like.

As such, there is a need in the industry to conserve the power in mobile terminals associated with short-range wireless communication readers to permit utilization of conventional power supplies and typical power supply charging schedules for the mobile terminals. Various attempts have been made to address power management in mobile terminals and, particularly those devices that are associated with short-range wireless communication readers.

One type of power-conserving method has been implemented for RFID short-range communication. The method involves limiting the "reading" of the identification RFID transponder, i.e., tag to only a portion of the tag, and if the RFID reader identifies that it has previously read the tag based upon the identification portion, the RFID reader does not read the rest of the tag. While this power-conserving method is helpful, the RFID reader still consumes more power than desired and the method does not address the problem of continual active operation.

In another recently developed power conservation method, an appropriate sensor measures the movement of the mobile terminal and active read operations continue while the movement of the device is unknown. When the movement of the device is identified, however, one or more of the subunits of the device is changed from an active operation mode to a sleep operation mode, where the sleep operation mode consumes less power than the active operation mode. The device then stays in the sleep operation mode while the movement of the device is known, and then changes back to the active operation mode when the movement of the device becomes unknown. Again, while this power-conserving method is helpful, the device still consumes more power than desired because the device is in an active operation mode anytime the movement is unknown, which amounts to most of the time that the device is in use due to the "mobile" nature of the device.

Thus, there is a need for techniques that permit greater conservation of power in mobile terminals associated with a short-range wireless communication transceiver/reader so that the mobile terminal does not need a larger power supply or frequent power supply charging. In particular a need exists to address the problems related to unwarranted power consumption related to a transceiver/reader that unnecessarily scans the proximate environment in instances in which the tags/transponders within the environment do not comply with the format supported by the transceiver/reader.

BRIEF SUMMARY OF THE INVENTION

The present invention provides for methods, mobile terminal devices and computer program products that reduce power consumption in multifunctional mobile terminal devices that are equipped with a short-range wireless communication device in read mode, such as an RFID device, a NFC device, a Bluetooth® device or the like. The invention is able to recognize short-range wireless communication signals that are not intended for the receipt by the reader, otherwise referred to as false triggering signals. For example, communication signals that are not formatted in a protocol that the device is configured to interface with. Once the invention recognizes that such false trigger signals are present and being received by the device, the invention will implement an interrupt lockout condition in which the standard system interrupt routine is locked-out or otherwise ignored for either a predetermined period of time or a dynamic period of time. For example, the lock-out condition may persist until a preset break in the false triggering signal transmissions is detected. Alternatively, the standard system interrupt routine will be locked-out for a flexible period of time based upon the quantity of false triggers observed during a predetermined time period. As such the present invention provides for mobile terminal power conservation by limiting the number of times that the processor must be fully activated to determine that a signal that is being received is not a supported signal format. It is noted that throughout this specification the terms "format", "data format" and "signal format" are used synonymously as an abbreviation for the phrase "a data format according to a protocol of a particular standard."

In one embodiment of the invention a multifunctional mobile terminal device is defined. The mobile terminal device will be equipped with a short-range wireless communication device in read mode that transmits wireless interrogation signals and receives responses from remote short-range wireless transponders. As such, the short-range wireless communication device may take the form of a Radio Frequency Identification (RFID) device, a Near Field Communication (NFC) device, an Infrared (IR) device, a Bluetooth® device (i.e., a device operating in the 2.4 GHz frequency band), any short-range communication device operating in any conceivable RF band or the like.

The mobile terminal will additionally include a processor in communication with the short-range wireless communication reader that provides for detection of an unsuccessful short-range wireless activation operation, otherwise referred to herein as an error event or a false trigger. Typically, the unsuccessful activation operation is related to a signal format unsupported by the mobile terminal device. The processor may include circuitry that detects the error event or false trigger or the processor may rely on software means operative by the processor to detect the error event or false trigger. In applications in which software is implemented, the routine may reside at the processor or it may reside within a mobile terminal associated memory/storage device.

The mobile terminal will additionally include a controller in communication with the processor. The processor and controller may be separate entities or they may be configured within one multifunctional processing unit. The controller provides for adjusting frequency of the operation of the short-range wireless communication device in response to detection of the unsuccessful short-range wireless activation operation. Adjusting the frequency of the device operation may entail masking-off the standard reader interrupt routine or otherwise altering the interrupt routine. The interrupt routine is defined as the routine that conventionally activates the device at predefined time intervals to provide for signal detection. In hardware embodiments, the circuit that controls the activation of the device will be locked-off or otherwise shut down for a predetermined period of time.

The transceiver/reader device may be configured such that it is physically embodied as a separate unit or it may be configured as unit within either the processor device or the controller device.

Additionally, the processor may be configured to account for error events or false triggers during the lock-off/mask-off period. Such detection of further error events or false triggers may provide for further adjustment of the frequency of the operation of the device in read mode, i.e., further lengthening the time between subsequent read operations. Typically, the length of time between subsequent read operations may be prolonged in step-wise fashion until a predetermined maximum back-off time is achieved. The normal interrupt routine may be resumed upon detection of a valid format supported by the device or user activity, at which point all back-off timers are cleared or the interrupt routine may resume after the lapse of a predefined back-off period of time.

The mobile terminal device may additionally include a signal sensing device in communication with the short-range wireless communication transceiver/reader that senses changes in the short-range wireless communication field and provides an activation signal to the read mode to initiate the activation or reading operation The invention is also embodied in a method for adjusting the power consumption in a multifunctional mobile terminal device. The method includes the steps of detecting an error event signifying an unsuccessful short-range wireless communication reading or activation operation and adjusting a frequency of a short-range wireless communication reading or activation operation in response to the detection of the error event. The method may further include the step of sensing changes in the short-range wireless communication field that result in an activation signal being provided to a short-range communication transceiver/reader.

The activation operation of the method may include an RFID activation operation, a NFC activation operation, an IR activation operation, an activation operation in the 2.4 GHz frequency range, such as a Bluetooth® or WLAN activation operation, or any other activation operation in a suitable RF band and the like. The step of detecting an error event signifying an unsuccessful short-range wireless communication activation operation is further defined by detecting a false trigger that is attributed to a signal format that is unsupported by the mobile terminal processing capabilities. The step of adjusting the frequency of the short-range wireless communication operation may further provide for masking off a routine that triggers the activation operation for a predetermined time period. Additionally, in hardware embodiments, the step of adjusting the frequency of the short-range wireless communication operation may further provide for shutting down the circuit that activates the reader for a predetermined period of time.

The method may further entail the step of further adjusting the frequency of the short-range wireless communication activation operation in response to a further detection of more error events. This step provides for the lock-off, mask-off or shut-down period to be extended if further error events; i.e., unsupported signals continue to be received by the mobile terminal device. Typically, extension of the lock-off, mask-off or shut-down period may be extended incrementally until a predetermined maximum lock-off-mask-off or shut-down period is attained.

The method may further include the steps of detecting a valid event signifying a successful short-range wireless communication activation operation and adjusting the frequency of the short-range wireless communication activation operation in response to detection of the valid event. This provides for the lock-off, mask-off or shutdown period to be terminated if the device receives a valid signal which the device is capable of supporting. Termination of the lock-off, mask-off or shutdown period will typically involve clearly the lock-off or mask-off timers of switching the circuit to an active state. Additionally, a user interface selection may be used to act as an override function to re-enable short-range communication.

In addition, the invention is defined by a computer program product for adjusting power consumption of a short-range wireless communication device associated with a multifunctional mobile terminal. The computer program product includes a computer-readable storage medium having computer-readable program code portions stored therein. The computer-readable program code portions include a first executable portion capable of detecting an error event signifying an unsuccessful short-range wireless communication activation operation and a second executable portion capable of adjusting the frequency of the short-range wireless communication activation operation in response to detection of the error event. The computer readable code may further include an optional third executable portion capable of sensing changes in the short-range wireless communication field that result in an activation signal being provided to a short-range communication transceiver/reader. Additionally, optional third executable instructions may provide for adjusting the frequency of the short-range communication activation operation based on the quantity of error events detected during a predetermined period of time.

Thus the present invention provides for methods, mobile terminal devices and computer program products that are capable of reducing power consumption by detecting error events signifying unsuccessful short-range wireless communication activation operations and adjusting the frequency of the activation of the transceiver/reader based on the detection of the error event. In this regard, the invention prevents the device from powering up the processor for the read operation when the mobile terminal is in the vicinity of a wireless communication system whose signals are being received by the mobile terminal but are not intended for the use of the mobile terminal. By limiting the powering up of the processor, power of the mobile terminal is preserved.

BRIEF DESCRIPTION OF THE DRAWINGS

Figure 1:
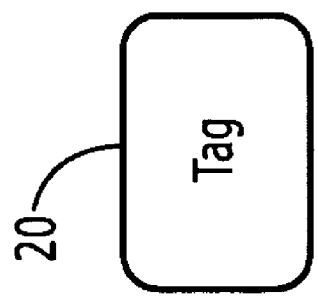
Figure 1:
Figure 1:
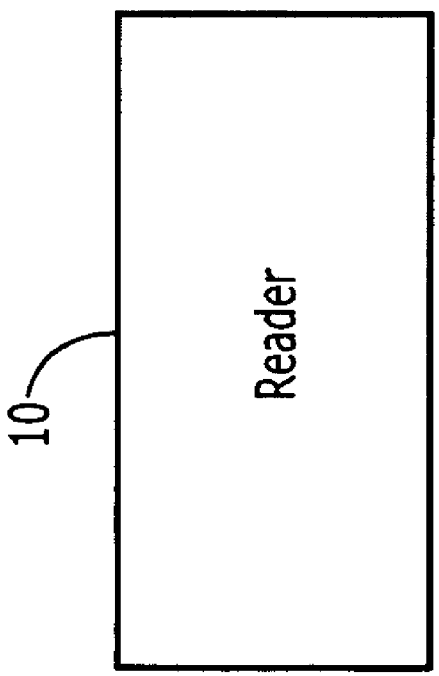

Having thus described the invention in general terms, reference will now be made to the accompanying drawings, which are not necessarily drawn to scale, and wherein:

FIG. 1 is a block diagram of a short-range communication system, implementing a reader and a tag, in accordance with an embodiment of the present invention.

Figure 2:
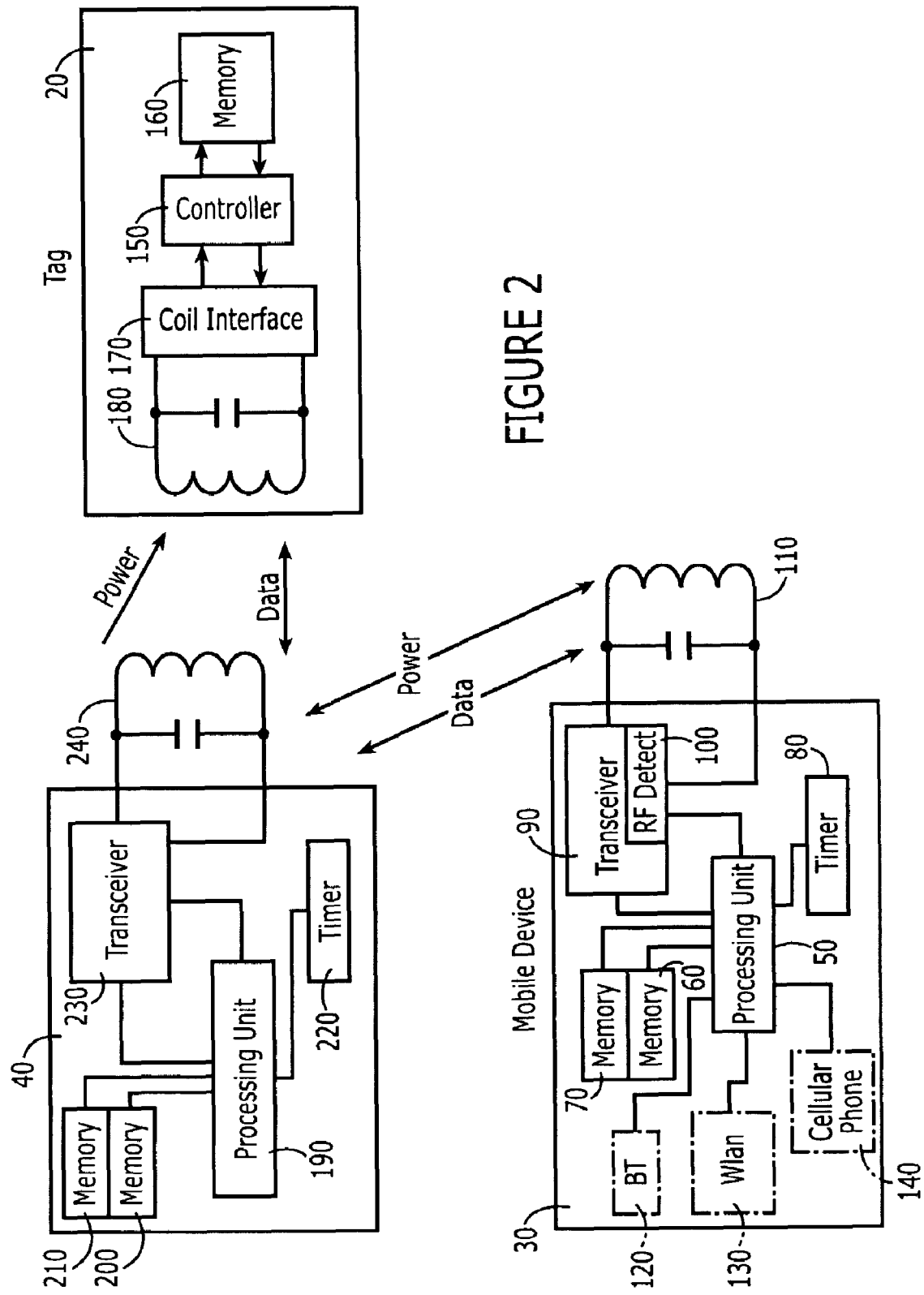

FIG. 2 is a block diagram of a short-range communication system, implementing a multifunctional communication mobile terminal/device, an infrastructure device and a tag, in accordance with an embodiment of the present invention.

Figure 3:
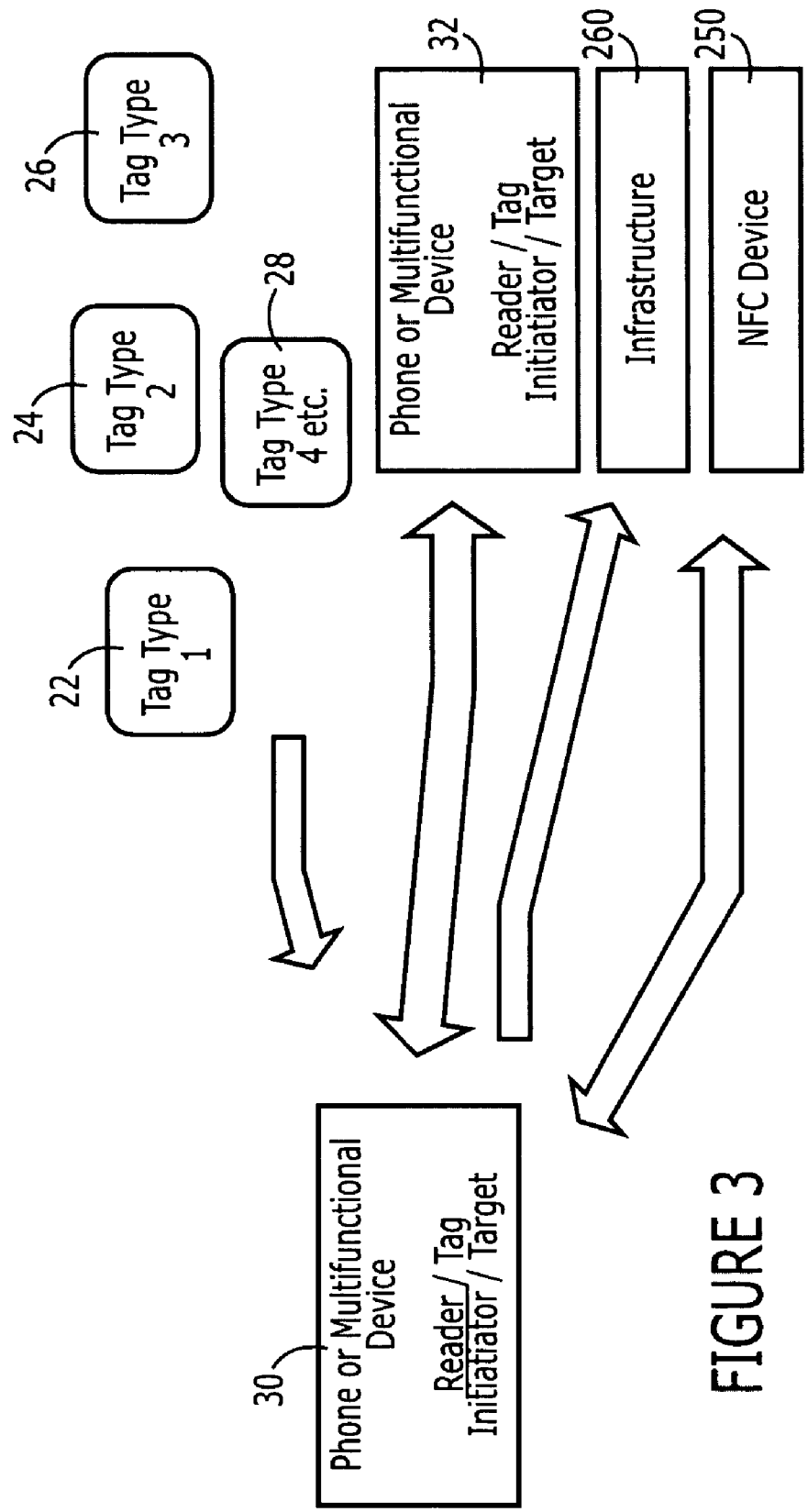

FIG. 3 is a block diagram of a short-range communication system, implementing a multifunctional communication mobile terminal/device and various devices and tags in communication with the mobile terminal/device, in accordance with an embodiment of the present invention.

Figure 4:
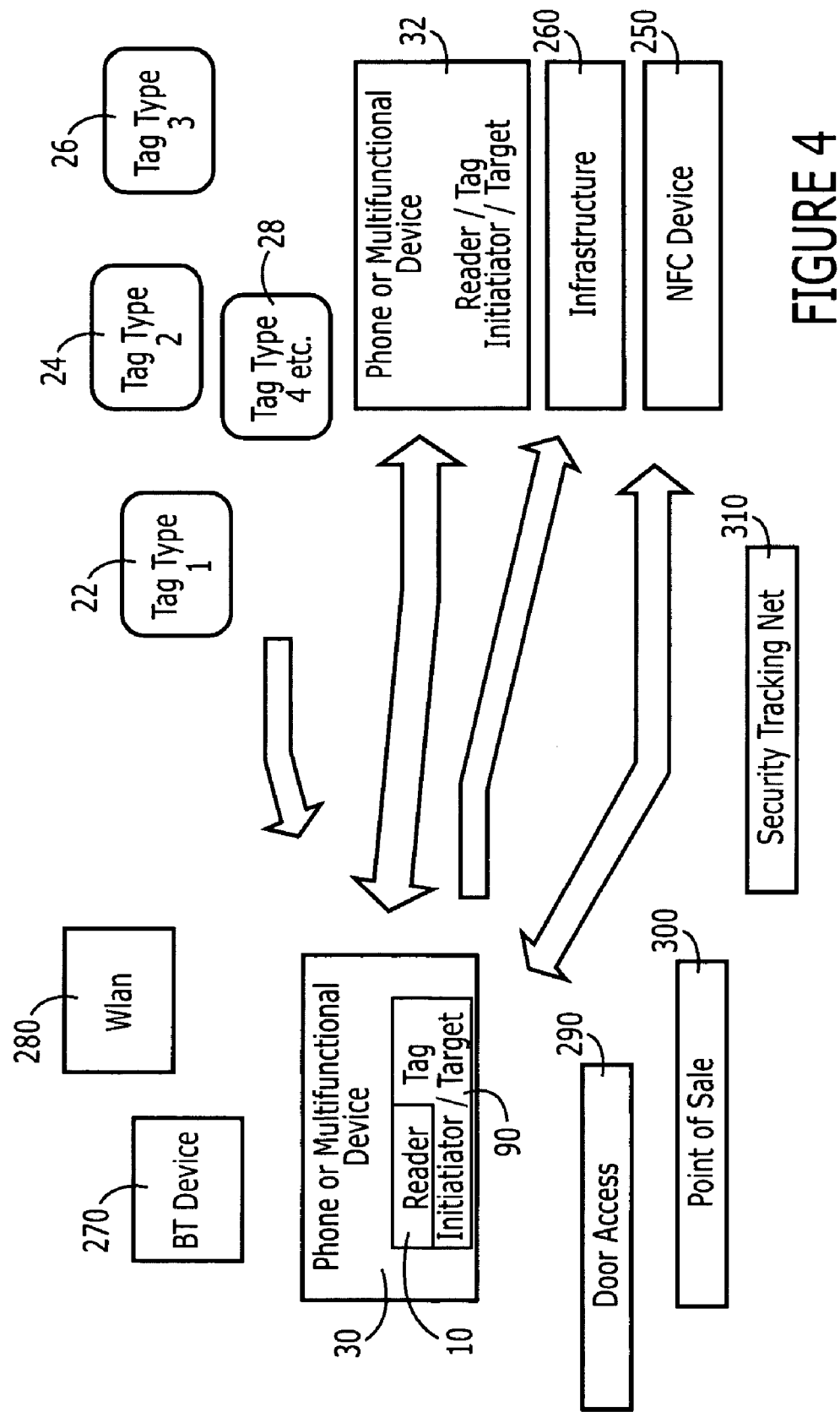

FIG. 4 is a block diagram of a short-range communication system, in which the multifunctional communication mobile terminal/device receives potential interfering communications, in accordance with an embodiment of the present invention.

Figure 5:
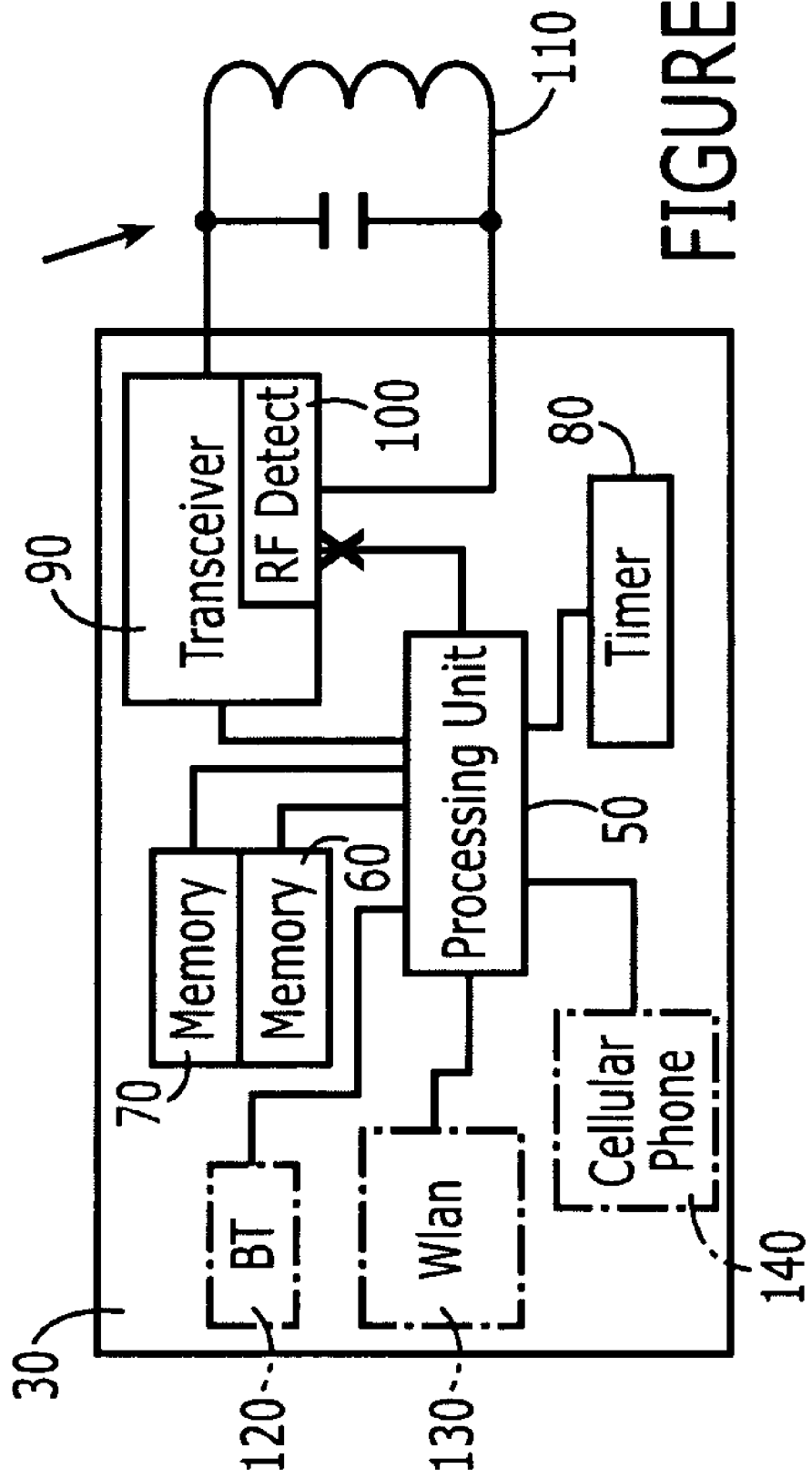

FIG. 5 is a block diagram of a mobile terminal/device implementing a user interface for disabling the auto detection in the transceiver or the RF detector in the mobile terminal/device, in accordance with an embodiment of the present invention.

Figure 6:
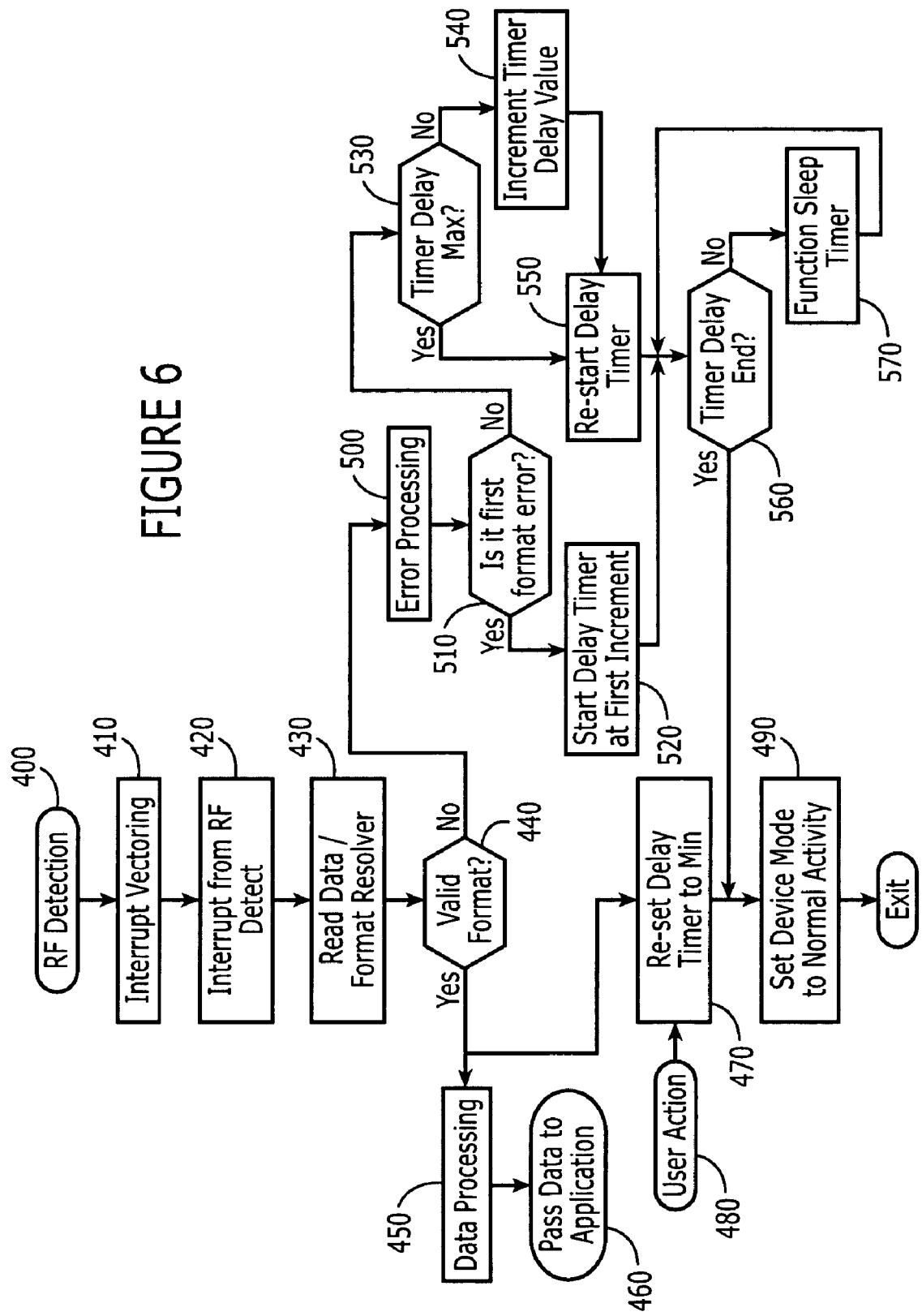

FIG. 6 is a flow diagram of a method for providing environment adaptive power conservation to a mobile terminal/device having short-range communication reading capabilities, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, shown is a block diagram illustrating basic wireless communication between a short-range communication reader device 10 and a short-range communication transponder, shown here as a passive short-range communication tag 20, in accordance with the prior art. The short-range communication reader device 10 may be embodied in a multifunctional mobile terminal/device (not shown in FIG. 1), such as a mobile telephone, a Personal Digital Assistant (PDA) or the like. The short-range communication reader will generate an excitation field that serves as both the tag's source of power and its master clock. The tag 20 cyclically modulates its data contents and transmits it to the reader's receiver circuit. The reader decodes the data and formats the data for further processing.

FIG. 2 provides a block diagram of a system for short-range wireless communication incorporating a multifunctional mobile terminal/device 30 having short-range wireless communication capability, a short-range communication tag 20 and an infrastructure device 40, in accordance with the prior art. The mobile terminal may be in short-range communication, such as near field communication or the like, with the tag 20 or the infrastructure device. By way of example, the infrastructure device may be a ticket gate, a Point of Sale (POS) device, a Wide Area Network (WAN) hotspot device or the like. Typically, the infrastructure device will be an active device that does not require excitation power from the mobile terminal; however, the infrastructure device may be a passive device, similar to the tag.

The passive nature of tag 20 will require that it be in the vicinity of the reader in order for the RF power field generated by either the mobile terminal 30 reader or the infrastructure device 40 to provide the power necessary to modulate the tag's data and transmit the data to the reader. In addition, data can be communicated to the tag via either the infrastructure device or the mobile terminal.

The mobile terminal 30 and the infrastructure device 40 may either transmit or receive data, thus acting as both a tag and a reader (or in Near Field Communication terminology a target or an initiator) depending upon the mode of device. For example, the mobile terminal may first communicate data to the infrastructure device with the mobile terminal acting in tag emulation mode. Once the infrastructure device receives data from the mobile terminal, the infrastructure device may transmit data to the mobile terminal. In NFC devices the first data transmission may be from either the mobile terminal or the infrastructure device.

It is noted that the short-range communication platform used for communication between the tag 20, mobile terminal 30, and the infrastructure device 40 may be any acceptable platform operating in any acceptable frequency band. For example, Bluetooth® or WLAN communications, which operate in the 2.4 GHz frequency band, may be implemented. However, communication is not limited to the 2.4 GHz frequency band and may include communication in the 900 MHz frequency band, the 5.8 GHz frequency band, the 13.56 MHz frequency band or the like.

The mobile terminal 30 will typically include a processing unit 50 that processes and controls data in the mobile terminal. The processing device will be in communication with static memory unit 60, dynamic memory unit 70, timer 80, and short-range communication transceiver 90 (the transceiver includes a reader device and a transmitter device), which incorporates RF detector 100. The transceiver is in communication with antenna 110 that serves to transmit and receive wireless short-range communication. The processing unit may further be in communication with optional Bluetooth® module 120, optional WLAN module 130, optional cellular telephone module 140 and other optional modules. An interrupt routine stored in the static memory unit 60 will be accessed and implemented by the processing unit in order to "power-up" the transceiver so that the RF detect transmits an excitation field and receives RF signals at prescribed intervals. The processing unit will rely on the timer to determine at what intervals signals should be communicated to the transceiver in order to activate the transceiver. The processor will also rely on the dynamic memory unit 70 to provide temporary storage during the processing of the interrupt routine.

The short-range communication tag 20 will typically include a controller 150 that is in communication with tag memory 160 and coil interface 170. The coil interface provides an interface between the controller and tag coil 180, which serves as an antenna for the receipt and transmission of RF signals. The RFID tag is typically a passive tag that is provided power by the excitation field transmitted by the transceiver of the mobile terminal. Once the tag has been "powered-up", the tag cyclically modulates, at the controller 150, the data contents stored in tag memory 160 and transmits it to the reader's receiver circuit via the coil 180. In alternate embodiments, in which the tag is an active tag, such as NFC active tags or the like, the power provided to the tag may active, i.e., internal, or passive, i.e., provided by the excitation filed transmits from the mobile terminal.

The infrastructure device 40 will typically include a processing unit 190 that processes and controls data in the infrastructure device. The processing device will be in communication with static memory unit 200, dynamic memory unit 210, timer 220, and short-range communication transceiver 230 (the transceiver includes a reader device and a transmitter device). The transceiver is in communication with antenna 240 that serves to transmit and receive wireless short-range communication.

FIG. 3 provides a block diagram of a multifunctional mobile terminal/device 30, such as a mobile telephone, PDA or other mobile multifunctional device equipped with a short-range communication transceiver 90, which may act as a reader and/or tag or as an initiator and/or target, in terms of NFC communication. If the mobile terminal is equipped with modules for various short-range communication platforms it will be possible for the device to communicate in various forms depending on the signals that the mobile terminal detects. For example, it may emulate a tag and transmit data to another device equipped with a reader or in reader mode it may receive data transmissions from tags or other devices. If the mobile terminal is equipped with NFC capabilities, then the transceiver can emulate a target or an initiator.

The transceiver may generate an excitation field that provides the power source for the various passive tag types. In the illustrated embodiment the excitation field may provide power to tag "type 1" 22, tag "type 2" 24, tag "type 3" 26, tag 'type 4" 28 or any other tag type. The tags will cyclically modulate their data content and transmit it to the reader's receiver circuit. If the reader is configured to read the data of the corresponding tag type, the reader will decode the data and format the data accordingly. The reader may not be able to read the data for various reasons, including but not limited to, data in any format not supported by the mobile terminal, wrong card type, wrong block size, wrong header format, data error from interference, encrypted data, improper data modulation scheme or the like. Formatting of data is generally defined by specific protocols according to certain standards.

The transceiver may additionally communicate with additional devices equipped with a short-range communication transceiver 90. These additional devices may include, but are not limited to other mobile terminals 32, such as a mobile telephone, a PDA or the like or the additional devices may include other Near Field Communication (NFC) devices 250. Other NFC devices may include any device that can communicate using the NFC protocol, for example commercial devices, such as televisions, video recorders, projectors, personal computers and the like. Communication between the mobile terminal 30 and the additional devices 32, 250 may be two-way communication, in that the mobile terminal may receive data content from the additional devices or the mobile terminal may transmit data content to the additional devices. Data content that is received from the additional devices will be read by the reader if the reader is configured to read the type of data associated with the additional devices. Additionally, the mobile terminal 30 may transmit data content to the infrastructure device 260, such as a ticket barrier, Point of Sale (POS), door access loop, WAN hotspot, media server or the like.

FIG. 4 depicts a block diagram of a short-range wireless communication environment in which potential interfering communications are received by the mobile terminal/device 30, in accordance with the prior art. The multifunctional mobile terminal/device 30 may receive interference communications from interfering devices such as Bluetooth® device 270, Wireless Local Area Network (WLAN) device 280, if the mobile terminal is not configured to read data of this data type, i.e., the mobile terminal does not include Bluetooth® module 120 and/or WLAN module 130 as depicted in FIG. 2. Additionally, the mobile terminal 30 may receive interference communication from a door access device 290, a point of sale device 300, a security tracking network device 310 or any other possible interfering device depending on the operational frequency of the communication and the ability of the transceiver of the mobile terminal to receive communication of such a frequency.

Interference communication, i.e., communication not intended for the mobile terminal, is detrimental to the mobile terminal, in that, unnecessary power is consumed by the mobile terminal in attempting to read data from the interference communication. Typically, when the device is in the presence of such interference communication the communications have in the past been continuous in nature. This will now frequently not be the case since the terminal device is mobile, by nature, and it must be expected that the device will move in and out of the interference range for differing transmission sources. The interference communication may additionally trigger more frequent activation of the transceiver, i.e., engine "wake-ups", which also causes unnecessary power consumption in the mobile terminal.

The present invention provides methods, devices and computer program products for recognizing interference communication or data content that is not a type formatted for its capabilities. The present invention provides three embodiments for mitigating power consumption in the mobile terminal caused by interference communication or unsupported data type communications received by the reader/transceiver of the mobile terminal. According to the first embodiment of the present invention, a user interface is providing for in the mobile terminal for activate/de-active the auto-detection circuit. Typically, mobile terminal readers/transceivers are configured such that they will be activated on a regularly scheduled basis, for example once every second, to "scan' the environment for short-range communications present in the environment. With this option, if the device user is aware that the device is currently residing in an environment with interfering communication, the user may choose to de-active the auto-detection circuit which disables the reader and/or the transceiver.

FIG. 5 provides a block diagram of a multifunctional mobile terminal/device incorporating a user interface for disabling the auto detection in the transceiver/RF detector, in accordance with an embodiment of the present invention. The mobile terminal/device 30 will include a user interface, such as a touch screen function, keypad function, switch or the like, that provides for a user input. The user interface is in communication with the processing unit 50, such that input by the user to the interface causes the processing unit to send a command to the transceiver 90, which disables the RF detector 100, disables the output of the RF detector and/or disables the transceiver device. The user will typically engage the user interface to disable the RF detector and/or transceiver when the mobile terminal is an environment in which false triggers are likely to be detected by the mobile terminal; i.e., an environment in which wireless signals not supported by the reading functions of the mobile terminal are present.

The second embodiment of the present invention provides for automatically "locking off" all interrupts or chosen interrupts, such as the RF detection interrupt once the mobile terminal determines that communication is an interfering communication or has data content that is not formatted according to the reading capabilities of the device. The "lock-off" period may either be a fixed period of time or until loss of the interfering signal or the unsupported data format signal. In certain instances, having a "lock-off" period that is released by the loss or stoppage of the signal may not be practical. This is especially, evident in instances in which the short-range communication, such as a NFC communication, has breaks between the radio frequency carrier/exciter transmissions.

The third embodiment of the present invention provides for an environment adaptive routine that provides for the activation of the signal detection circuitry to occur less frequently if a false trigger is detected and for the frequency of the activation of the signal detection circuitry to be further adjusted if the false trigger persists, if numerous false triggers occur during a signal detection period or if the false trigger no longer appears. A false trigger is defined as a radio frequency signal not carrying a correct data format capable of being interpreted by the associated device.

FIG. 6 provides for a flow diagram that describes the flow of a method for providing environment adaptive power conservation to a multifunctional mobile terminal/device having short-range communication capabilities. It should be noted that the method described in FIG. 6 is by way of example only and that other adaptive power conservation methods are also possible and within the inventive concepts herein disclosed. Any method that recognizes false triggers and alters the interval for performing RF detection based on the false trigger is within the gamut of the present invention.

According to the illustrated embodiment, at step 400 detection of a short-range communication signal occurs at the mobile terminal. At step 410, once the signal has been detected the processor will vector in to an interrupt service routine, typically specific to the device from which the signal is being activated from. Once the interrupt service routine is completed, the processor can return to performing the interrupted processes. At step 420, the interrupt from the RF detect is resolved from all other possible interrupt sources within the mobile terminal platform. At step 430, the reader reads the data in the short-range communication signal and performs format resolving.

At step 440, a determination is made as to whether the signal includes a valid format that can be processed further by the reader. If the determination is made that the signal does include validly formatted data then, at step 450, the data is processed and at step 460, the processed data is communicated to the application associated with the data. In addition to processing the valid data, a determination that the data is validly formatted will trigger, at step 470, a user interface action that will reset the timer to the minimum time. The minimum time defines the shortest interval in which the short-range communication detector/transceiver will be activated to receive short-range communication transmissions. This is because as long as the data being read is valid data, the interval between activation periods should remain at a minimum. Thus, in concurrence with the timer being re-set to the minimum time, at step 490, the mobile terminal signal detection mode is set to normal activity.

If at step 440, a determination is made that the signal does not include validly formatted data then error processing occurs, at step 500, which typically notifies the user that the signal includes data which can not be read. At step 510, a determination is made as to whether the format error is the first format error of this type processed by the device. A first error message would signify that this is the first time the device has encountered a signal including this type of unsupported data format. If the determination is made that this is the first time this format error has occurred then, at step 520, the delay timer is set at the first increment of delay. If the determination is made that this is not the first time this format error has occurred then, at step 530, a determination is made as to whether the timer delay is currently set at the maximum allowable delay. If a determination is made that the timer is not set at the maximum allowable delay then, at step 540, the timer delay is incremented by a predefined time value and, at step 550, the delay timer is re-started. If the determination is made that the timer is set to the maximum allowable delay then, at step 550, the delay timer is restarted.

Once the delay timer has been incremented, either a first increment or a subsequent increment and started or started based on a determination that the timer delay is at a maximum allowable value, the delay time will ensue and, at step 560, a determination is made as to whether the timer delay has ended. If the timer delay has ended because no more false triggers have occurred within the boundary times for delay, then the device, at step 490, will return to normal activity mode in which signal detection occurs at the normal intervals. If, at step 560, a determination is made that the timer delay period had not ended then, at step 570, the sleep timer will be activated for this communication function.

Thus, the present invention provides for methods, mobile terminal devices and computer program products that are capable of reducing power consumption by detecting error events signifying unsuccessful short-range wireless communication activation operations and adjusting the frequency of the activation of the reader based on the detection of the error event. In this regard, the invention prevents the device from powering up the processor for the read operation when the mobile terminal is in the vicinity of a wireless communication system whose signals are being received by the mobile terminal but are not intended for the use of the mobile terminal. By limiting the powering up of the processor the RF detector and/or the transceiver, power of the mobile terminal is preserved. The invention additionally provides for an embodiment in which the rate of incremental back-off and return to the standard operational timings are also based on the number of error events seen/detected within a predetermined time frame.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    a short-range wireless communication reader configured to transmit wireless interrogation signals and receive responses from remote short-range wireless transponders;
    a processor in communication with the short-range wireless communication reader that provide for detection of a data transmission having a given data format and determine that the given format is not one of one or more supported formats of the short-range wireless communication reader; and
    a controller in communication with the processor that is configured to provide for adjusting a frequency of operation of the short-range wireless communication reader in response to the processor determining that the given format is not one of the one or more supported formats of the short-range wireless communication reader, wherein adjusting the frequency of operation of the short-range wireless communication reader includes implementing a delay before activating of the short-range wireless communications reader in response to detection of the data transmission having the given format, the delay being incremented based on a number of detections of data transmissions having formats not being one of the one or more supported formats.

2. The apparatus of claim 1, further comprising a signal sensing device in communication with the short-range wireless communication reader that senses changes in the short-range wireless communication field and provides an activation signal to the reader.

3. The apparatus of claim 1, wherein the short-range wireless communication reader is further defined as a Radio Frequency Identification (RFID) device operating in any RFID frequency band.

4. The apparatus of claim 1, wherein the short-range wireless communication reader comprises at least one of the processor and the controller.

5. The apparatus of claim 1, wherein the processor comprises the controller.

6. A method comprising:
    detecting a first error event, wherein detecting the first error event comprises:
        providing for detection of a data transmission having a given data format, and
        determining that the given format is not one of one or more supported formats; and
    adjusting, via a processor, a frequency of short-range wireless communication activation in response to the detection of the first error event, wherein adjusting the frequency of short-range wireless communication activation includes implementing a delay in response to detection of the first error event, the delay being incremented based on a number of detections of error events.

7. The method of claim 6, further comprising directing sensing of changes in the short-range wireless communication field that result in an activation signal being provided to a short-range communication device.

8. The method of claim 6, further comprising: detecting a second error event while the frequency of the short-range wireless communication activation operation is adjusted in response to detection of the first error event; and further adjusting the frequency of a short-range wireless communication activation operation in response to the detection of the second error event.

9. The method of claim 6, further comprising: detecting a valid event signifying a successful short-range wireless communication activation operation while the frequency of the short-range wireless communication activation operation is adjusted in response to detection of the first error event; and adjusting the frequency of a short-range wireless communication activation operation in response to the detection of the valid event.

10. The method of claim 6 further comprising readjusting the frequency of the short-range wireless communication activation operation after a predetermined period of time.

11. The method of claim 6, wherein detecting the first error event further comprises detecting an error event signifying an unsuccessful Radio Frequency Identification (RFID) activation operation.

12. The method of claim 11, wherein adjusting a frequency of a short-range wireless communication activation operation in response to the detection of the error event further comprises adjusting a frequency of a RFID activation operation in response to the detection of the first error event.

13. The method of claim 6, wherein detecting the first error event further comprises detecting an error event signifying an unsuccessful near Field Communication (NFC) operation.

14. The method of claim 6, wherein adjusting a frequency of a short-range wireless communication activation operation in response to the detection of the first error event further comprises adjusting a frequency of a NFC activation operation in response to the detection of the first error event.

15. A computer-readable storage medium having computer-readable program code portions stored therein, the computer-readable program code portions comprising:
    a first executable portion configured to detect an error event, wherein detecting the error event comprises:
        providing for detection of a data transmission having a given data format, and
        determining that the given format is not one of one or more supported formats; and
    a second executable portion configured to adjust a frequency of the short-range wireless communication activation in response to detection of the error event, wherein being configured to adjust the frequency of short-range wireless communication activation includes being configured to implement a delay in response to detection of the error event, the delay being incremented based on a quantity of error events detected.

16. The computer program product of claim 15, wherein the computer-readable code portions further comprise a third executable portion configured to direct sensing of changes in the short-range wireless communication field that result in an activation signal being provided to a short-range communication device.

17. The computer program product of claim 15, wherein the first executable portion configured to cause detecting an error event signifying an unsuccessful short-range wireless communication activation operation further defines the short-range wireless communication as a Radio Frequency Identification (RFID) reader operating in any RFID frequency band.

18. The computer program product of claim 15, wherein the computer-readable code portions further comprise third executable portion configured to cause adjusting the frequency of the short-range wireless communication activation operation based on the quantity of error events detected during a predetermined period of time.

19. An apparatus comprising at least one processor and at least one memory including computer program code, the at least one memory and the computer program code configured to, with the at least one processor, cause the apparatus to perform at least the following:
  providing for short-range wireless communications using one or more supported data formats;
  providing for detection of a data transmission having a given data format;
  determining that the given format is not one of the one or more supported formats; and
  providing for adjusting a frequency of operation of a short-range wireless receiver in response to determining that the given format is not one of the one or more supported formats, wherein adjusting the frequency of operation of the short-range wireless receiver includes implementing a sleep mode timer before activating of the short-range wireless communications receiver in response to detection of the data transmission having the given format, the sleep mode timer being incremented based on a number of detections of data transmissions having formats not being one of the one or more supported formats.

20. The apparatus of claim 19 wherein the apparatus is caused to perform providing for detection of the data transmission by providing for the detection of a near field communication (NFC) having the given format.

21. A method comprising:
  providing for short-range wireless communications using one or more supported data formats;
  providing for detection of a data transmission having a given data format; and
  providing for adjusting, via a processor, a frequency of operation of a short-range wireless receiver in response to determining that the given format is not one of the one or more supported formats, wherein adjusting the frequency of operation of the short-range wireless receiver includes implementing a sleep timer before activating of the short-range wireless communications receiver in response to detection of the data transmission having the given format, the sleep mode timer being incremented based on a number of detections of data transmissions having formats not being one of the one or more supported formats.

22. The method of claim 21 wherein providing for detection of the data transmission comprises providing for the detection of a near field communication (NFC) having the given format.

23. An apparatus comprising at least one processor and at least one memory including computer program code, the at least one memory and the computer program code configured to, with the at least one processor, cause the apparatus to perform at least the following:
  providing for detection of a data transmission having a given data format;
  providing for activation of a transceiver upon detection of the data transmission, the transceiver having previously been dormant;
  determining that the given format is not one of one or more supported formats; and
  providing for adjustment of a delay period in response to determining that the given format is not one of the one or more supported formats, the delay period being implemented prior to a next activation of the transceiver, wherein the delay period is incremented based on a number of detections of data transmissions having formats not being one of the one or more supported formats.

24. The apparatus of claim 23, wherein the apparatus caused to perform determining that the given format is not one of one or more supported formats, includes being caused to perform determining that the given format is not one of one or more supported formats, the processing capabilities of the apparatus or the other apparatus being incapable of supporting the given format.

* * * * *